United States Patent
Warren

[11] Patent Number: 5,680,308
[45] Date of Patent: Oct. 21, 1997

[54] AUTOMOBILE TRANSFER CASE SYSTEM AND CONTROL CIRCUIT THEREFOR

[75] Inventor: James David Warren, Clayton, N.C.

[73] Assignee: Borg-Warner Automotive, Inc., Sterling Heights, Mich.

[21] Appl. No.: 431,550

[22] Filed: May 1, 1995

[51] Int. Cl.⁶ .................................................. B60K 23/08
[52] U.S. Cl. .......................... 364/424.098; 364/423.098; 180/233
[58] Field of Search .......................... 364/424.01, 424.1, 364/424.05, 424.098, 423.098; 180/233, 245, 247, 248

[56] References Cited

U.S. PATENT DOCUMENTS

| | | | |
|---|---|---|---|
| 4,433,390 | 2/1984 | Carp et al. | 364/900 |
| 4,556,943 | 12/1985 | Pauwels et al. | 364/431.12 |
| 4,661,752 | 4/1987 | Nishikawa et al. | 364/424.05 X |
| 4,664,217 | 5/1987 | Welch et al. | 180/247 |
| 4,937,750 | 6/1990 | Gilliam | 364/424 |
| 4,989,686 | 2/1991 | Miller et al. | 180/197 |
| 5,042,627 | 8/1991 | Ishikawa et al. | 192/40 |
| 5,095,438 | 3/1992 | Sasaki | 364/431.11 |
| 5,407,024 | 4/1995 | Watson | 180/248 |
| 5,445,258 | 8/1995 | Bigley et al. | 192/85 |
| 5,492,194 | 2/1996 | McGinn et al. | 180/233 |

Primary Examiner—Collin W. Park
Attorney, Agent, or Firm—Reising, Ethington et al; Greg Dziegielewski

[57] ABSTRACT

An improved automobile transfer case system (10) and electronic control circuit (16) therefor utilizes a reset circuit (70), a microprocessor (72), and an output stage (74) to operate an electronically controlled coupling (38,58) that is used to switch between drive modes in the transfer case (14) of a full or part-time four wheel drive vehicle. The microprocessor (72) is connected to a source of operating power that is available even when the vehicle ignition is switched off. The microprocessor (72) runs in two modes, a low power standby mode and an operating mode. The microprocessor enters the standby mode when vehicle ignition is switched off and it has finished any tasks that were in progress when the ignition was turned off. The reset circuit (70) responds to the ignition being switched on to provide a hardware reset of the microprocessor (72) that wakes it up from its standby mode and places it into the operating mode. Once in the operating mode, the microprocessor (72) determines the current driving mode via a position encoder (60), as well as the desired mode via a switch (68), and thereafter makes any desired or needed shifts between driving modes. The reset circuit (70) includes a combinational logic circuit (78) and an RC circuit (80) which provides a time constant that determines the width of the reset pulse provided to the microprocessor (72). The reset circuit (70) receives a signal indicative of which mode the microprocessor (72) is in so that the microprocessor will not be reset if it is already in the operating mode.

11 Claims, 2 Drawing Sheets

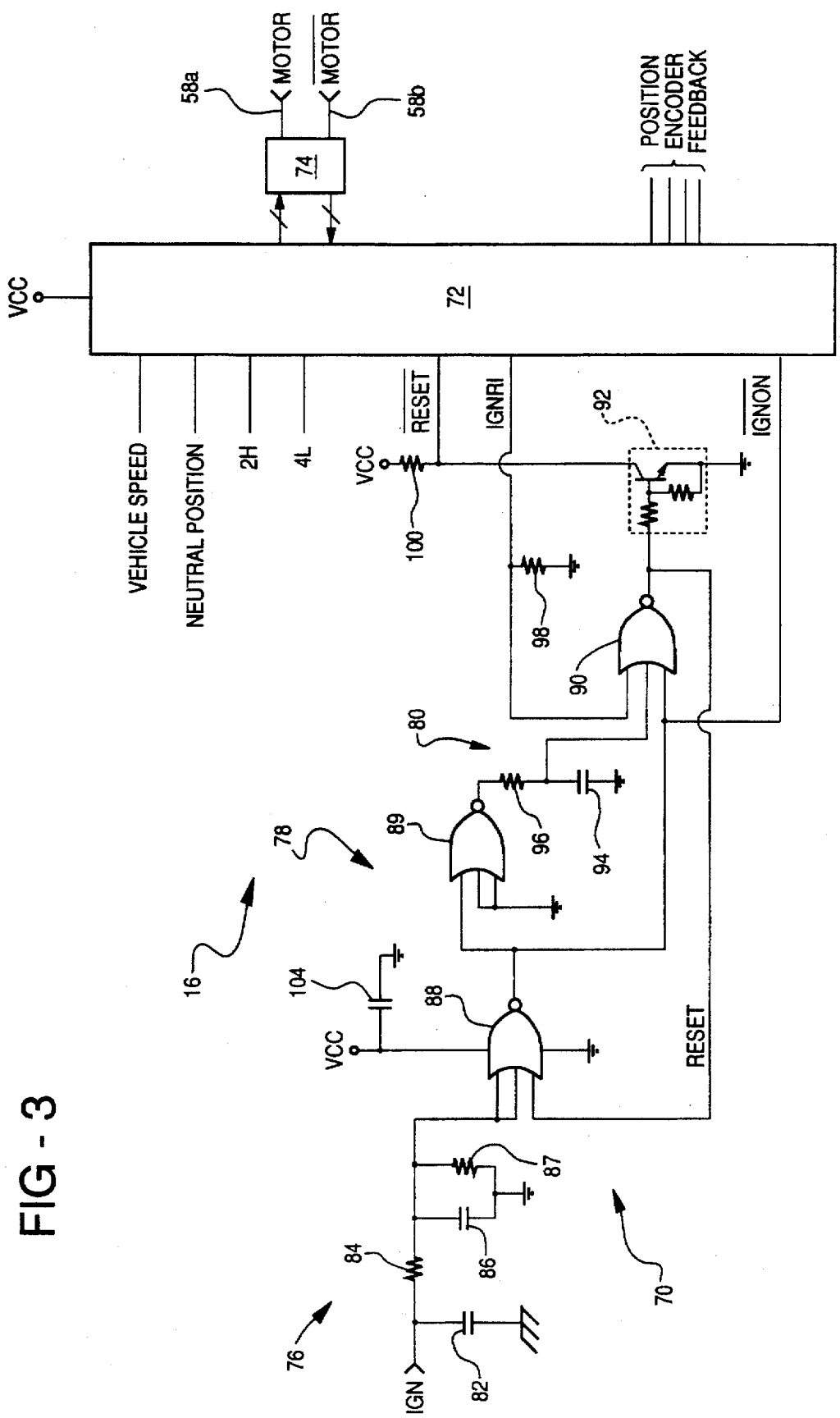

AUTOMOBILE TRANSFER CASE SYSTEM AND CONTROL CIRCUIT THEREFOR

TECHNICAL FIELD

The present invention relates generally to transfer case systems for full and part-time four-wheel drive automobiles and, more particularly, to such transfer case systems that switch driving modes under the control of a microprocessor based circuit.

BACKGROUND OF THE INVENTION

Transfer cases are used in full and part-time four-wheel drive (4WD) vehicles to distribute driving power received on an input shaft from the vehicle's transmission to a pair of output drive shafts, one of which drives the vehicle's front wheels and the other of which drives the vehicle's rear wheels. In vehicles that permit shifting between two-wheel drive (2WD) and 4WD modes, the input shaft provides continuous drive power to one of the output shafts and selectively provides drive power to the other output shaft via some type of a disengagable or otherwise adjustable coupling, such as a viscous coupling, electromagnetic clutch, or positionable spur gearing. Other drive modes are sometimes provided, including four-wheel high (4H) for higher 4WD speeds, four-wheel low (4L) for lower 4WD speeds, neutral for disengaging the transmission from the front and rear axles to allow towing, and locked 4WD for controlling wheel slippage.

Historically, activation of the adjustable coupling to shift between drive modes has been accomplished manually using a mechanical shift actuator. Electronic control of the shift actuator is now more common, particularly for shift actuators that can be operated by a rotational source, such as an electric motor. U.S. Pat. No. 4,664,217, issued May 12, 1987 to D. W. Welch et al., provides one such example wherein a reversible dc electric motor is used to rotate a cammed shift actuator to selectively shift drive gearing within the transfer case between neutral, 2WD, and low and high speed 4WD modes. Selection of a desired drive mode is accomplished by operating the motor under control of a microprocessor based control circuit. The microprocessor commands a motor drive circuit that utilizes two relays to energize the motor to run in either the clockwise or counterclockwise direction, with the microprocessor determining the direction of rotation needed to achieve the desired drive mode.

These microprocessor based transfer case control circuits sometimes utilize an RC reset circuit so that the microprocessor is properly reset whenever the vehicle ignition is turned on and the microprocessor is powered up. The reset circuit includes a resistor connected between the circuit power supply (VCC) and the microprocessor's active low reset input, as well as a capacitor connected between the microprocessor's reset input and ground. The VCC supply is dependent upon the state of the vehicle ignition; that is, it is off when the vehicle ignition is off, powers up when the vehicle ignition is switched on, and stays active as long as the ignition is on. The VCC supply is also used to power the microprocessor. Thus, whenever the ignition is switched on and VCC comes up, the microprocessor is powered up. The microprocessor's reset input remains low for a short time after power-up due to the gradual charging of the capacitor through the resistor. The duration of the reset signal depends upon the time constant of the resistor and capacitor, as is well known. The microprocessor responds to this reset signal by entering an initialization mode in which the microprocessor places the motor drive circuit in a safe, inactive state (e.g., motor off) and determines which of the available driving modes the transfer case is in. In electric shift transfer case systems, this determination can be done by analyzing feedback signals from a position encoder attached to the electric shift motor.

Since the microprocessor's reset input has a high input impedance, there is no low impedance path through which the reset circuit's capacitor discharges when the vehicle ignition is turned off and VCC disappears. Thus, when the circuit powers down, the capacitor discharges primarily through the same resistor used to charge it during power up. One problem inherent in this arrangement is that if the ignition is momentarily switched off and then back on, the VCC supply voltage may temporarily fall below the minimum voltage level needed to operate the microprocessor, but the capacitor will discharge slowly and may not discharge enough to fall below the voltage level needed to activate the reset input. Consequently, when VCC comes back up, the microprocessor will not be reset and can potentially power up in an unknown and undesirable state or at an undesirable place within its control program.

A second problem inherent in this arrangement arises partially due to the amount of time required to switch driving modes. In most instances, shifting fully between driving modes can be accomplished in a relatively short amount of time (i.e., roughly two to four seconds). In other cases, a longer period may be required. For example, in the event there exists some obstacle to shifting between driving modes, the microprocessor may be programmed to periodically retry the shifting until some timeout period (e.g., thirty seconds) elapses. Whether shifting takes two or thirty seconds, these periods are sufficiently large that switching off the vehicle ignition could cause the control circuit to power down in the middle of a shifting between driving modes. This is undesirable because it would result in the transfer case being left in an undefined state; that is, halfway shifted between two driving modes.

SUMMARY OF THE INVENTION

In accordance with the present invention there is provided an improved electronic control circuit for an electronically controlled coupling of a vehicle transfer case system. The electronic control circuit includes a reset circuit, a microprocessor, and an output stage. The reset circuit has an ignition input and a reset output coupled to the microprocessor. The microprocessor has at least one output coupled to the output stage to provide command signals thereto. The output stage has an output for providing control signals to the electronically controlled coupling in response to the command signals.

The electronic control circuit is characterized by the microprocessor being selectively operable in a first mode and a second mode, with the microprocessor operable under program control to send commands to the output stage when it is in the first mode. The microprocessor has a data output coupled to the reset circuit, with the microprocessor operable to generate a mode signal on the data output when the microprocessor is in one of the first and second modes. The reset circuit is operable in response to receiving on the ignition input a signal indicative of activation of the ignition system to generate a reset signal on the reset output when the microprocessor is in the second mode.

BRIEF DESCRIPTION OF THE DRAWINGS

A preferred exemplary embodiment of the present invention will hereinafter be described in conjunction with the appended drawings, wherein like designations denote like elements, and:

FIG. 3 is a schematic showing a microprocessor reset circuit used in the electronic control circuit of FIGS. 1 and 2.

DESCRIPTION OF THE PREFERRED EMBODIMENT

Figure 1:
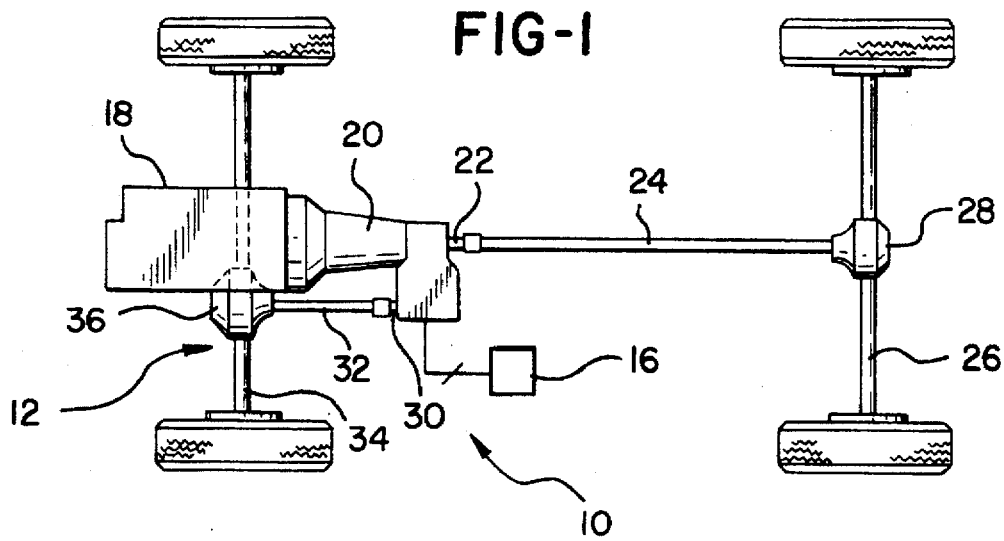
FIG. 1 is a top view of a vehicle drivetrain that includes an electric shift transfer case system of the present invention and that includes a schematic representation of an electronic control circuit used by the transfer case system.

As shown in FIG. 1, an electronically controlled transfer case system of the present invention, designated generally as 10, is shown connected as part of a vehicle drive train 12. Transfer case system 10 includes a transfer case 14 and a microprocessor based electronic control circuit 16 connected to transfer case 14 to control the drive mode provided by transfer case 14. As is common, drive train 12 includes an engine 18 that provides driving power to transfer case 14 via a transmission 20. A first output shaft 22 of transfer case 14 provides power to a rear driveshaft 24 that drives a rear axle 26 via a rear differential 28. A second output shaft 30 of transfer case 14 provides power to a front driveshaft 32 that drives a front axle 34 via a front differential 36. As will be discussed below, transfer case 14 provides various driving modes, such as two-wheel drive, neutral, and low and high speed four-wheel drive, with the shifting between drive modes being performed under the control of electronic circuit 16.

Figure 2:
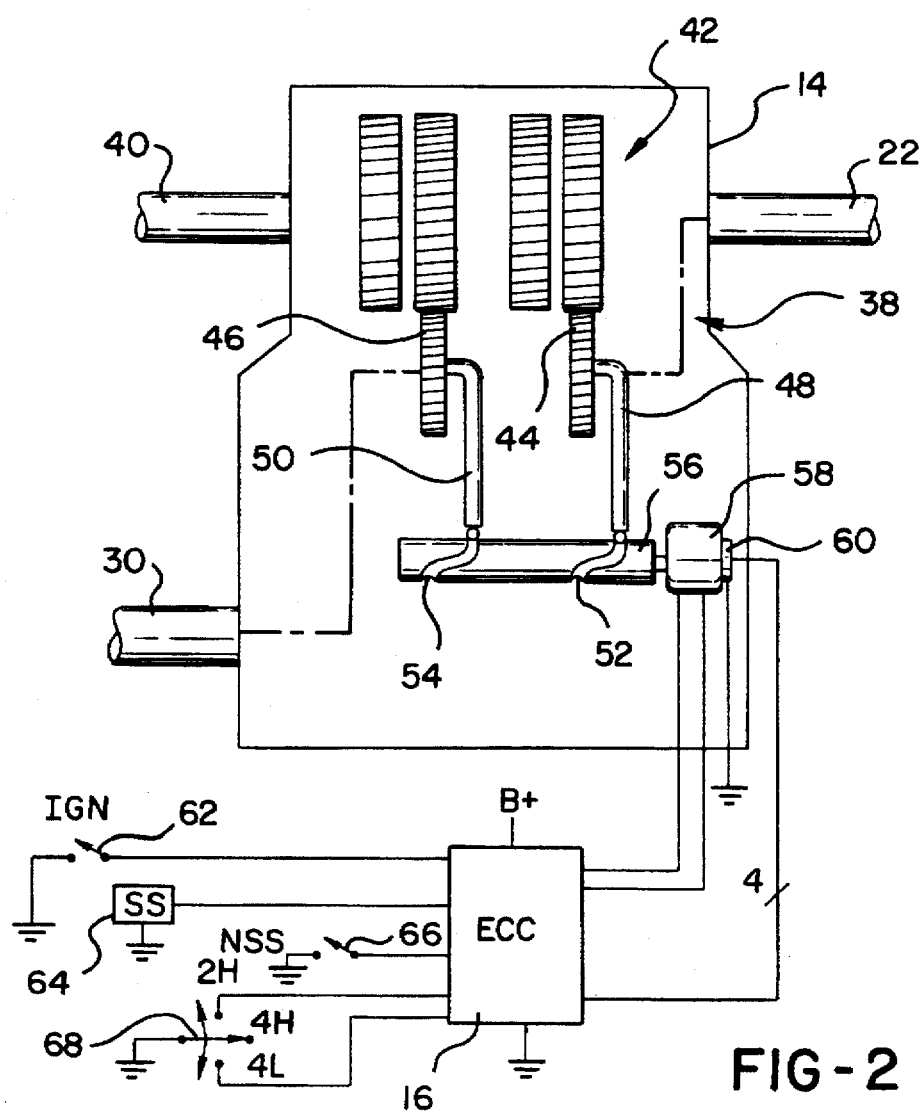
FIG. 2 is a partially schematic and partially diagrammatic illustration of the electric shift transfer case system of FIG. 1, including a transfer case and the electronic control circuit.

Referring now to FIG. 2, transfer case 14 and circuit 16 are shown in greater detail. An exemplary form of transfer case 14 is diagrammatically illustrated. In general, it is an electric shift type transfer case that includes a positionable spur gearing assembly 38 that permits selection of various drive modes by controlling the rotational position of a single shaft. In particular, it has an input shaft 40 from transmission 20 that drives a spur gearset 42. Rear output shaft 22 and front output shaft 30 are driven via a pair of respective gears 44 and 46 that can be selectively brought into and out of engagement with various gears within gearset 42 by a pair of respective actuator yokes 48 and 50. The different drive modes provided by transfer case 14 are selected by appropriate positioning of gears 44 and 46 with respect to gearset 42. Actuator yokes 48 and 50 are positionable using cams 52 and 54, respectively, which are attached to a rotatable shaft 56 that is driven by an electric motor 58 through a worm and gear (not shown) or other suitable speed reducer. Positionable spur gearing assembly 38 and motor 58 together comprise an electronically controlled coupling that is connected to, and operated by, electronic control circuit 16. Other such couplings are known to those skilled in the art. Further details of transfer case 14, including positionable assembly 38 and motor 58, can be found in the above-noted U.S. Pat. No. 4,664,217, the complete disclosure of which is hereby incorporated by reference. Transfer case 14 can be Borg-Warner Transfer Case Part Nos. 44-08-000-001, 44-08-000-002, 44-21-000-001, and 44-21-000-002. Motor 58 is preferably a brushless dc motor, such as a Borg-Warner Shift Motor Part No. 44-08-648-001.

Operation of motor 58 in both the clockwise and counterclockwise directions is controlled by microprocessor circuit 16 using information provided to it from various sensors and switches. Feedback position information for shaft 56 is provided by a position encoder 60 that is attached to motor 58 to sense its rotational position. Circuit 16 receives five inputs: an ignition signal IGN, a vehicle speed signal, a neutral position signal, and a pair of mutually exclusive drive mode input signals that are used to indicate the operator's selection of two-wheel drive, four-wheel drive high, or four-wheel drive low. The ignition signal is derived from, and can come directly from, the vehicle's ignition switch 62. It is used to indicate the general operating state of the vehicle (i.e., whether the ignition system is on or off) so that the microprocessor knows when to switch into a low power standby mode. The speed signal is provided by a magnetic pickup or other conventional speed sensor 64. It is used to provide circuit 16 with an indication of vehicle speed so that operation of motor 58 to shift between drive modes is carried out only under the speed conditions appropriate for the desired change in driving modes. The neutral position signal is provided by a neutral safety switch 66 that indicates whether or not transmission 20 is in neutral. The two drive mode signals are provided by a manually operated mode selection switch 68 that has a first selectable position for providing an active low two-wheel drive mode signal on one input of circuit 16, a second selectable, but unconnected position for selecting four-wheel high drive mode, and a third selectable position for providing an active low four-wheel low drive mode signal on a second, input of circuit 16. Connection to circuit 16 of the second selectable position of switch 68 is unnecessary since circuit 16 recognizes the selection of four-wheel high drive mode by the absence of both of the two active low signals provided by switch 68. Specific implementations of the switches and sensors to generate the input signals used by circuit 16 and the particular use to which these signals is put by circuit 16 are well known to those skilled in the art, as exemplified by the discussion found in the above-noted U.S. Pat. No. 4,664, 217, which has been herein incorporated by reference.

Electronic circuit 16 can also be used to operate other electronically controlled devices (not shown) that are utilized within transfer case 14. For example, it can be used to operate a solenoid that controls a vacuum to engage the front hubs when changing from two to four-wheel drive. It can also be used to control a magnetic synchronizer clutch within transfer case 14 that is used to synchronize rotation of the non-engaged output drive shaft with the input drive shaft when switching from two to four-wheel drive. The use of electronic circuit 16 to control such devices is well-known to those skilled in the art.

Turning now to FIG. 3, there is shown a reset circuit 70, microprocessor 72, and motor drive circuit 74 that are included as a part of electronic control circuit 16. Reset circuit 70 and microprocessor 72 are connected to a voltage supply VCC that is derived from the vehicle battery and that is available even when the vehicle ignition is off. The vehicle battery is also used to provide the operating power needed by motor drive circuit 74 to energize motor 58. In general, microprocessor 72 operates in either of two modes: an active, operating mode and an inactive low power standby mode. When in its operating mode, microprocessor 72 controls motor drive circuit 74 to energize motor 58 as necessary to shift between the various drive modes available. For this purpose, it receives the vehicle speed signal, neutral position signal, and the two drive mode signals, as well as feedback signals from position encoder 60. When in its standby mode, microprocessor 72 is in a "sleep" mode in which it draws a very low quiescent current and therefore consumes very little power. It places itself in the standby mode when the vehicle ignition is off. Reset circuit 70 provides a hardware reset (−RESET) of microprocessor 72 upon the vehicle ignition being switched on to take the microprocessor out of its standby mode and into its operating mode. For this purpose, reset circuit 70 receives the ignition signal IGN and a reset inhibit signal IGNRI that microprocessor 72 provides as an indication of which operating state it is in and that is used by reset circuit 70 to prevent resetting of the microprocessor when it is already in its operating mode. Once reset, microprocessor 72 can begin performing tasks in accordance with its operating program. For example, upon waking up and entering the operating mode, it uses feedback from position encoder 60 to determine what driving mode the transfer case is in, and can thereafter switch transfer case 14 to a different driving mode if one is specified by mode selector switch 68.

By providing operating power to microprocessor 72 and motor drive circuit 74 even when the vehicle ignition is off and by providing reset circuit 70 with a signal (IGNRI) indicative of the operating mode of microprocessor 72, several advantages are realized. First, since changes in the state of the vehicle ignition do not affect the supply of operating power to the microprocessor, there is no risk of the microprocessor becoming active in an undefined state or somewhere in the middle of its control program. Thus, microprocessor 72 becomes active not by being powered up at its supply voltage (VCC) pin, but rather by being woken up from a low power standby mode. Second, microprocessor 72 enters its operating mode by a hardware reset that causes the microprocessor to begin execution of its control program at a known and desirable location. Third, since microprocessor 72 and motor drive circuit 74 can continue to operate after the vehicle ignition has been switched off, the microprocessor can finish whatever task it may be performing (such as a shift between driving modes) before becoming inactive so that the transfer case is always left in a known state (i.e., fully shifted into one of the available driving modes). Fourth, since reset circuit 70 receives inhibit signal IGNRI from microprocessor 72 while it is in its operating mode, reset circuit 70 can avoid generating a hardware reset that would otherwise occur due to noise or momentary switching of the ignition off and on.

With continued reference to FIG. 3, the construction and operation of reset circuit 70 will now be described in greater detail. Reset circuit 70 includes an input filter stage 76, a combinational logic circuit 78, and an RC circuit 80. Filter stage 76 is used to remove high frequency noise that could otherwise cause the reset signal −RESET to be inadvertently generated. Combinational logic circuit 78 responds to IGN being asserted (i.e., changing to a logic high level) to generate the −RESET signal as an active low pulse having a pulse width determined by RC circuit 80. IGNRI will prevent −RESET from being generated whenever microprocessor 72 is in its operating mode.

Filter stage 76 comprises a π type low pass filter that includes a capacitor 82 connected between the ignition input IGN and ground, followed by a series connected resistor 84 and a second capacitor 86 connected to ground at the output of filter stage 76. Capacitor 82 provides EMI suppression and resistor 84 and capacitor 86 are preferably selected to provide the low pass filter with a cutoff frequency at its −3 db point of approximately 210 Hz.

Combinational logic circuit 78 is implemented using three, three-input NOR gates 88–90, each of the which can be one third of a 74HC27. It also includes an inverting npn transistor 92 that provides the −RESET output that is provided to the active low reset pin of microprocessor 72. NOR gate 88 is configured as a two input NOR gate with two of its inputs tied together to receive the filtered IGN signal from filter stage 76. A pulldown resistor 87 connected between ground and these inputs has a resistance value selected in accordance with that of resistor 84 so as to form a voltage divider that provides the proper logic voltage level to NOR gate 88 when IGN is asserted. The other input of NOR gate 88 receives a feedback signal that, in effect, latches positive transitions of the IGN signal during assertion of −RESET. The output of NOR gate 88 is labelled −IGNON and is provided to a first one of the inputs of NOR gates 89 and 90, as well as to a data input of microprocessor 72 as an indication of the state (on or off) of the vehicle's ignition system. It is essentially the inverse of the IGN signal, but may not always mirror IGN because of the latching provided by the feedback to NOR gate 88 from NOR gate 90. NOR gate 89 is configured as an inverter and therefore has its other two inputs connected to ground. The output of inverter 89 is provided to RC circuit 80 which comprises a capacitor 94 connected to ground and a resistor 96 in series between capacitor 94 and the output of inverter 89. As will be appreciated, capacitor 94 is charged and discharged by inverter 89 via resistor 96. The voltage appearing across capacitor 94 is provided to a second one of the inputs of NOR gate 90. The third input of NOR gate 90 is IGNRI from microprocessor 72. The output of NOR gate 90 is the RESET signal that drives and is inverted by transistor 92. A pulldown resistor 98 is connected between the IGNRI output and ground and a pullup resistor 100 is connected to the −RESET output of circuit 70 to bias these outputs to their normal, unasserted logic levels. A capacitor 104 connected to the VCC input of the NOR gate chip provides instantaneous energy for switching of NOR gates 88–90.

Operation of reset circuit 70 is as follows. In the absence of IGN, combinational logic circuit 78 will stabilize such that the RESET output of NOR gate 90 is at a logic low level. This is due to the fact that both the input and output of inverter 89 are used as steady state inputs to NOR gate 90 so that in the absence of changes of IGN, the output of NOR gate 90 always settles to a logic zero. Under these circumstances, the output of NOR gate 88 will be a logic one resulting in the output of inverter 89 being at a logic zero level that completely discharges capacitor 94. The logic one provided by the output of NOR gate 88 will hold the output of NOR gate 90 at a logic zero level regardless of the state of IGNRI. Since RESET is at a logic zero, transistor 92 remains switched off and the active low reset is pulled to a logic one by resistor 100. Also, since the vehicle ignition is off (i.e., IGN is a logic zero), microprocessor 72 will in accordance with its control program enter into the standby mode and IGNRI will therefore be at a logic zero. Consequently, microprocessor 72 will be shut down into a dormant state from which it can be woken only by either a hardware reset or an interrupt.

When the vehicle ignition is switched on, IGN is asserted, causing the output of NOR gate 88 to go to a logic zero and the output of inverter 89 to go to a logic one level that begins charging capacitor 94 via resistor 96. Since the voltage across capacitor 94 will not immediately rise to a logic one level, all three inputs to NOR gate 90 will be at a logic zero level, causing its output to switch to a logic one level. As a result, transistor 92 begins conducting, pulling the −RESET output of circuit 70 low which resets microprocessor 72, waking it up out of its standby mode. The output of NOR gate 90 will remain at a logic one level until capacitor 90 has charged up to a voltage level recognized by NOR gate 90 as a logic one, at which time the output of NOR gate 90 will return to a logic zero and the −RESET signal will therefore return to a logic one, ending the resetting of microprocessor 72. Thus, reset circuit 70 operates similar to a monostable multivibrator in that it produces an active low −RESET pulse that is triggered by assertion of IGN. Also, it will be appreciated that the width of the −RESET pulse is determined by the time constant provided by capacitor 94 and resistor 96. Preferably, this time constant is approximately five milliseconds, which is about two orders of magnitude greater than the pulse width needed to reset microprocessor 72.

To prevent the −RESET pulse from being cut short due to IGN switching back to a logic zero level during assertion of −RESET, the RESET output of NOR gate 90 is fed back to an input of NOR gate 88 so that the output of NOR gate 88 will be held at a logic zero during the pulse regardless of the logic state of IGN. Also, microprocessor 72 preferably monitors −IGNON and, once that signal has continuously remained asserted for a predetermined amount of time following the −RESET pulse (e.g., forty milliseconds total), microprocessor 72 sets its IGNRI output high and begins its various routines (e.g., determining the current state of transfer case 14). The routines carried out by microprocessor 72 to control transfer case 14 are well known to those skilled in the art. Further, the programming of microprocessor 72 to generate the commands provided to motor drive circuit 74 in response to the various inputs discussed above is well within the level of skill in the art and will therefore not be further elaborated upon here.

As long as the vehicle ignition remains on, −IGNON will remain asserted (i.e., at a logic zero) and microprocessor 72 will continue to run in the operating mode with IGNRI at a logic one preventing any further reset signals from circuit 70. When the vehicle ignition is switched off and −IGNON returns to a logic one, microprocessor 72 finishes any tasks currently in progress and then switches back to the standby mode. Prior to switching modes, it waits until the −IGNON signal remains continuously unasserted for approximately two hundred milliseconds. Thereafter, microprocessor 72 lies dormant and again waits for another −RESET pulse from reset circuit 70.

At the output side of microprocessor 72 is an output stage that drives the electronically controlled coupling of transfer case 14. In the electric shift transfer case system 10 illustrated in the drawings, this output stage is in the form of motor drive circuit 74 which operates the motor 58 utilized by the electronically controlled coupling of transfer case 14. Circuit 74 can be a conventional motor drive circuit that provides operating current to motor 58 in either of two directions to provide bi-directional control of the rotation of motor 58. Suitable implementations of motor drive circuit 74 will be known to those skilled in the art. One such circuit is described in the aforenoted U.S. Pat. No. 4,664,217. Preferably, circuit 74 is implemented using an H-bridge of drive transistors or other semiconductor switches to selectively connect or disconnect each of the two motor leads 58a and 58b to power or ground. Motor drive circuit 74 can also include an interface circuit (not shown) between microprocessor 72 and the drive transistors that prevents the microprocessor from commanding the motor drive circuit into a short circuit condition or any other operating mode that involves an undesirable combination of conductive and non-conductive states of the drive transistors. Preferably, this interface circuit is implemented using a combinational logic circuit that receives a clockwise command, counter-clockwise command, and enable signal from microprocessor 72. The clockwise and counter-clockwise commands are used to specify the direction of rotation of motor 58 and the enable signal is used to specify whether either of those two commands should be carried out. Preferably, following any energization of motor 58, it is commanded by microprocessor 72 into a demagnetization state by open circuiting the lead to which current was supplied while maintaining the other lead connected to ground. Following demagnetization, motor 58 is then preferably put into a braking mode in which both motor leads 58a and 58b are connected by the appropriate ones of the drive transistors to ground. Motor drive circuit 74 can also provide microprocessor 72 with a status feedback that indicates whether the two outputs of motor drive circuit 74 are at a low or high impedance state so that microprocessor 72 can monitor the operation of motor 58 and detect the occurrence of any fault conditions.

In a highly preferred embodiment, microprocessor 73 comprises an MC68HC705C4, manufactured by Motorola, transistor 92 comprises a MUN2214T1 transistor, also manufactured by Motorola, resistors 84, 96, and 98 each has a resistance of 47KΩ, resistor 87 has a resistance of 100KΩ, resistor 100 has a resistance of 3.3KΩ, capacitor 82 has a capacitance of 1000pF, and capacitors 86, 94, and 104 each has a capacitance of 0.1 µF.

It will thus be apparent that there has been provided in accordance with the present invention an electric shift transfer case system and electronic control circuit therefor which achieve the aims and advantages specified herein. It will of course be understood that the foregoing description is of a preferred exemplary embodiment of the invention and that the invention is not limited to the specific embodiment shown. Various changes and modifications will become apparent to those skilled in the art. For example, rather than using reset circuit 70 to provide a hardware reset that brings microprocessor 72 out of its standby mode, the ignition signal IGN could be used to generate an interrupt that wakes up the microprocessor and causes it to enter the operating mode. A suitable interrupt service routine could then be used to handle any interrupts generated by changes of IGN that occur once the microprocessor has already entered the operating mode. This and all other such variations and modifications are intended to come within the scope of the appended claims.

I claim:

1. In a transfer case system (10) for an automobile having first and second electronically selectable drive modes and an ignition system switchable between an on state and an off state, said transfer case system having a transfer case (14) and an electronic control circuit (16), said transfer case (14) having a rotatable input shaft (40), first and second rotatable output shafts (22,30), and an electronically controlled coupling (38,58) between said input shaft and said second output shaft to permit drive torque to be transferred from said input shaft to said second output shaft, said electronic control circuit (16) having a microprocessor (72) and an output stage (74), with said output stage being connected to said electronically controlled coupling (38,58) and said microprocessor being operable under program control to send commands to said output stage that cause said coupling to shift the vehicle between the first and second drive modes, wherein said transfer case system (10) is characterized by:
said microprocessor (72) having a voltage supply input for receiving operating power that is supplied to said microprocessor independently of the state of the ignition system;
said microprocessor (72) being selectively operable in a first mode when the ignition system is in the on state and a second mode when the ignition system in the off state, wherein said microprocessor is operable under program control to send commands to said output stage (74) when in said first mode; and said electronic control circuit (16) having a reset circuit (70) that includes a data input and a reset output with said reset output being coupled to an input of said microprocessor (72), wherein, when said microprocessor is in said second mode, said reset circuit is operable to generate a reset signal on said reset output in response to receiving on said data input a signal indicative of the ignition system being switched from the off state to the on state and wherein said microprocessor is operable to switch from said second mode to said first mode in response to receiving said reset signal.

2. A transfer case system as defined in claim 1, wherein said first mode is an operating mode and said second mode is a low power standby mode, and wherein said microprocessor (72) draws less power when in said standby mode than when in said operating mode.

3. A transfer case system as defined in claim 1, wherein said microprocessor (72) includes a data output coupled to said reset circuit (70) and wherein said microprocessor is operable to generate an inhibit signal on said data output when said microprocessor is in said first mode.

4. A transfer case system as defined in claim 3, wherein said inhibit signal prevents said reset circuit from generating said reset signal.

5. A transfer case system as defined in claim 1, wherein said reset circuit (70) comprises a combinational logic circuit (78) and an RC circuit (80).

6. A transfer case system as defined in claim 5, wherein said combinational logic circuit (78) includes a plurality of digital logic circuit elements (88–90), each of which has an output, and said RC circuit (80) comprises a capacitive element (94) and a resistive element (96), with said resistive element being connected in series between said capacitive element and at least one of said outputs of said logic circuit elements.

7. A transfer case system as defined in claim 1, wherein said microprocessor (72) includes a second input and wherein said microprocessor is operable to switch from said first mode to said second mode in response to receiving on said second input a signal indicative of the ignition system being switched from the on state to the off state.

8. A transfer case system as defined in claim 1, wherein said reset circuit (70) and said electronically controlled coupling (38,58) each have a voltage supply input for receiving operating power that is supplied independently of the state of the ignition system.

9. In an electronic control circuit (16) for controlling an electronically controlled coupling (38,58) within a transfer case (14) of a vehicle, said electronic control circuit (16) having a reset circuit (70), a microprocessor (72), and an output stage (74), said reset circuit (70) having an ignition input and a reset output coupled to said microprocessor (72), said microprocessor having at least one output coupled to said output stage (74) to provide command signals thereto, and said output stage having an output for providing control signals to the electronically controlled coupling (38,58) in response to said command signals;

wherein said electronic control circuit (16) is characterized by:

said reset circuit (70) having a data input coupled to an output of said microprocessor (72), with said microprocessor being operable in a normal operating mode to generate said command signals and to provide an inhibit signal to said data input of said reset circuit; and said reset circuit (70) being operable in response to an input signal on said ignition input and in the absence of said inhibit signal to generate a reset signal on said reset output; and said reset circuit (70) being operable to utilize said inhibit signal to prevent generation of said reset signal in response to receiving the input signal on said ignition input.

10. In an electronic control circuit (16) for controlling an electronically controlled coupling (38,58) within a transfer case (14) of a vehicle, said electronic control circuit (16) having a reset circuit (70), a microprocessor (72), and an output stage (74), said reset circuit (70) having a reset output coupled to a first input of said microprocessor (72) with said reset circuit being operable to provide said microprocessor with a reset signal in response to receiving a signal indicative of an ignition system of the vehicle being switched from an off state to an on state;

said microprocessor having at least one output coupled to said output stage (74) to provide command signals thereto, and said output stage having an output for providing control signals to the electronically controlled coupling (38,58) in response to said command signals;

wherein said electronic control circuit (16) is characterized by:

said microprocessor (72) having a second input for receiving a signal indicative of the state of the ignition system, wherein said microprocessor is operable to enter a first mode in response to said reset signal on said first input and is operable to enter a second mode in response to receiving on said second input a signal indicative of the ignition system being switched from an on state to an off state.

11. An electronic control circuit as defined in claim 10, wherein said microprocessor (72) includes an output coupled to an input of said reset circuit (70) and wherein said microprocessor is operable when in said first mode to generate an inhibit signal on said input of said reset circuit, and further wherein said inhibit signal prevents said reset circuit from generating said reset signal.

* * * * *